United States Patent [19]
Chen

[11] Patent Number: 5,238,359
[45] Date of Patent: Aug. 24, 1993

[54] GARBAGE TRUCK

[76] Inventor: Chin-Lung Chen, No. 55-2, Pen-Chou Rd., Kang-San Chen, Kaohsiung Hsien, Taiwan

[21] Appl. No.: 802,416

[22] Filed: Dec. 4, 1991

[51] Int. Cl.$^5$ .............................................. B60P 1/54
[52] U.S. Cl. .................................. 414/517; 92/165 R; 92/165 PR; 296/100; 414/525.6; 414/547; 414/555
[58] Field of Search .................. 414/509–517, 414/521, 546, 547, 550, 555, 525.2, 525.6; 296/100, 219; 92/165 R, 165 PR

[56] References Cited

U.S. PATENT DOCUMENTS

| | | | |
|---|---|---|---|
| 1,835,405 | 12/1931 | Kaplan et al. | 296/219 |
| 3,080,988 | 3/1963 | Redman | 414/555 X |
| 3,765,554 | 10/1973 | Morrison | 414/550 X |
| 3,796,331 | 3/1974 | Dutton | 414/550 X |
| 3,954,194 | 5/1976 | Stedman | 414/550 |
| 4,538,951 | 9/1985 | Yeazel et al. | 414/517 X |
| 4,542,931 | 9/1985 | Walker, Jr. | 296/100 |
| 4,632,628 | 12/1986 | Kress et al. | 414/517 X |
| 4,717,196 | 1/1988 | Adams | 296/100 X |
| 4,744,287 | 5/1988 | Miyamoto | 92/165 PR X |
| 4,795,206 | 1/1989 | Adams | 296/100 X |
| 4,881,865 | 11/1989 | Herolf | 414/555 X |
| 4,941,796 | 7/1990 | DeFilippi | 414/517 X |
| 5,040,843 | 8/1991 | Russell et al. | 296/100 X |

FOREIGN PATENT DOCUMENTS 328062  4/1930  United Kingdom ............... 296/100

*Primary Examiner*—David A. Bucci
*Attorney, Agent, or Firm*—Jacobson, Price, Holman & Stern

[57] ABSTRACT

A garbage truck includes a motor truck having a garbage container provided thereon. The garbage container confines a garbage receiving space and has a top end provided with a garbage inlet opening and a rear side provided with a garbage outlet opening. A power-operated hoisting unit is provided on the motor truck adjacent to the garbage container. The hoisting unit is operated so as to move garbage into the garbage container. A power-operated top cover unit is provided on the top end of the garbage container so as to cover the garbage inlet opening. A power-operated side cover unit is provided on the rear side of the garbage container so as to cover the garbage outlet opening. A power-operated push plate unit is movably provided inside the garbage receiving space opposite to the garbage outlet opening. The push plate unit is operated so as to push garbage out of the garbage container through the garbage outlet opening.

6 Claims, 11 Drawing Sheets

GARBAGE TRUCK

BACKGROUND OF THE INVENTION

1. Field of the Invention

The invention relates to a garbage truck, more particularly to a garbage truck which has a larger garbage collecting capacity, which requires less manpower, and which reduces the contact of garbage collectors with refuse.

2. Description of the Related Art

As the volume of refuse generated increases, there is always a need to provide a better and more efficient way of collecting garbage. At present, garbage collection is done only at night when traffic is light so as to reduce the amount of time needed to service a garbage collection route. Referring to FIG. 1, a conventional garbage truck (1) is shown to comprise a motor truck (11) and a garbage container (12) provided on a rear end of the motor truck (11). The container (12) confines a relatively small garbage receiving space (13), and thus, only a limited amount of refuse can be collected at one time. Therefore, it is sometimes necessary to make several trips so as to collect all of the garbage on one garbage collection route. Note that the placing of refuse inside the receiving space (13) is done manually. This operation is time-consuming and requires a large amount of manpower. Furthermore, the garbage collectors are in contact with refuse for relatively long periods of time. Thus, the health of the garbage collectors is in danger because of their prolonged exposure to an unsanitary environment.

A second kind of a garbage truck (not shown) has been developed in order to reduce the contact time of garbage collectors with refuse. FIG. 2 illustrates a garbage receiving bin (14) used with this kind of a garbage truck. The garbage receiving bin (14) is positioned at a predetermined location on the garbage collection route. The garbage receiving bin (14) confines a receiving space (15) for receiving the refuse of neighboring households. The receiving bin (14) is pushed toward the garbage truck so as to transfer the contents of the former to the latter. The contact time of the garbage collectors with refuse is thus reduced.

Note that since the receiving bin (14) can accommodate a relatively small volume of refuse, one cannot help but place garbage outside the receiving bin (14) when the receiving bin (14) is full. Thus, manual handling of garbage is still necessary due to the limited volume of the receiving bin (14).

The main drawbacks of the above disclosed garbage trucks are as follows:

1. The garbage carrying capacity of the garbage trucks is relatively small. The size of the garbage container (12) is relatively small, and thus, the volume of garbage which can be accommodated per trip is correspondingly less. It is therefore necessary to make several trips on one garbage collection route when collecting a large volume of refuse.

2. Manual placement of garbage into the receiving space (13) is time-consuming, tiring and inconvenient. Referring once more to FIG. 1, garbage has to be raised by a height (H) corresponding to the vertical displacement of the receiving space (13) from the ground when moving garbage into the receiving space (13).

3. The garbage collectors are in contact with refuse for relatively long periods of time. The health of the garbage collectors is in danger because of their prolonged exposure to an unsanitary environment.

SUMMARY OF THE INVENTION

Therefore, the objective of the present invention is to provide an improved garbage truck which can overcome the main drawbacks of the above mentioned prior art.

More specifically, the main objective of the present invention is to provide a garbage truck which has a larger garbage receiving space, which requires less manpower and which can achieve garbage collection at a faster pace.

Another objective of the present invention is to provide a garbage truck which reduces the contact time of the garbage collectors with refuse.

Accordingly, the preferred embodiment of a garbage truck of the present invention comprises: a motor truck means having a garbage container provided thereon, said garbage container confining a garbage receiving space and having a top end provided with a garbage inlet opening and a rear side provided with a garbage outlet opening; a power-operated hoisting means provided on the motor truck means adjacent to the garbage container, said hoisting means being operated so as to move garbage into the garbage container; a power-operated top cover means provided on the top end of the garbage container to cover the garbage inlet opening; a power-operated side cover means provided on the rear side of the garbage container to cover the garbage outlet opening; and a power-operated push plate means movably provided inside the garbage receiving space opposite to the garbage outlet opening, said push plate means being operated so as to push garbage out of the garbage container through the garbage outlet opening.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
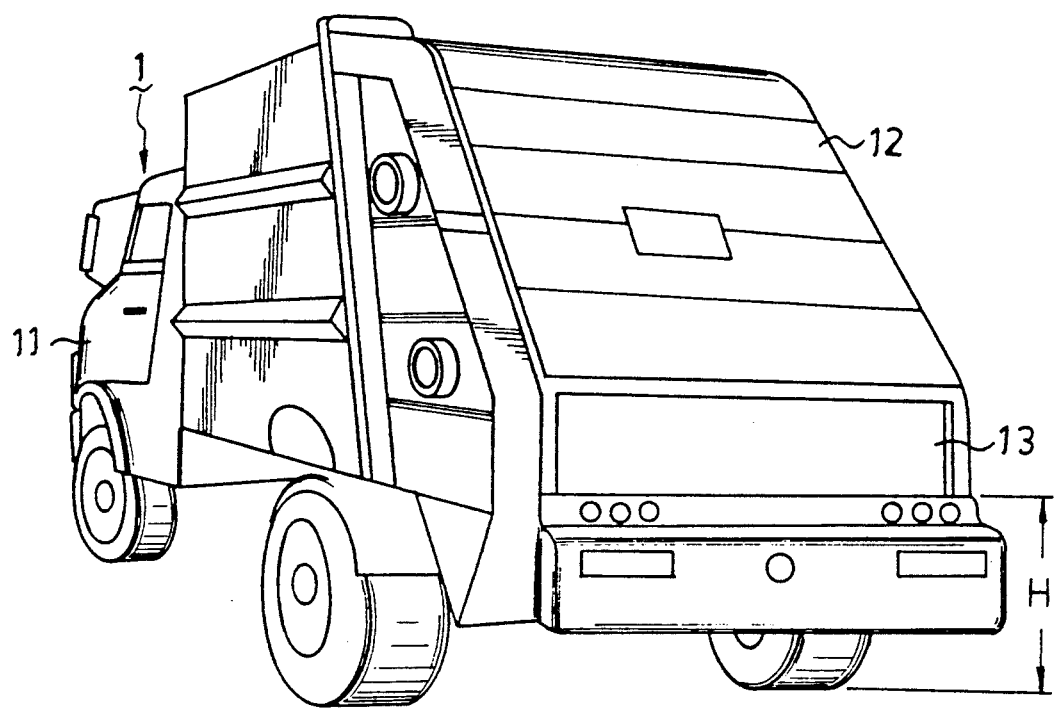
FIG. 1 illustrates a first example of a conventional garbage truck.
Figure 2:
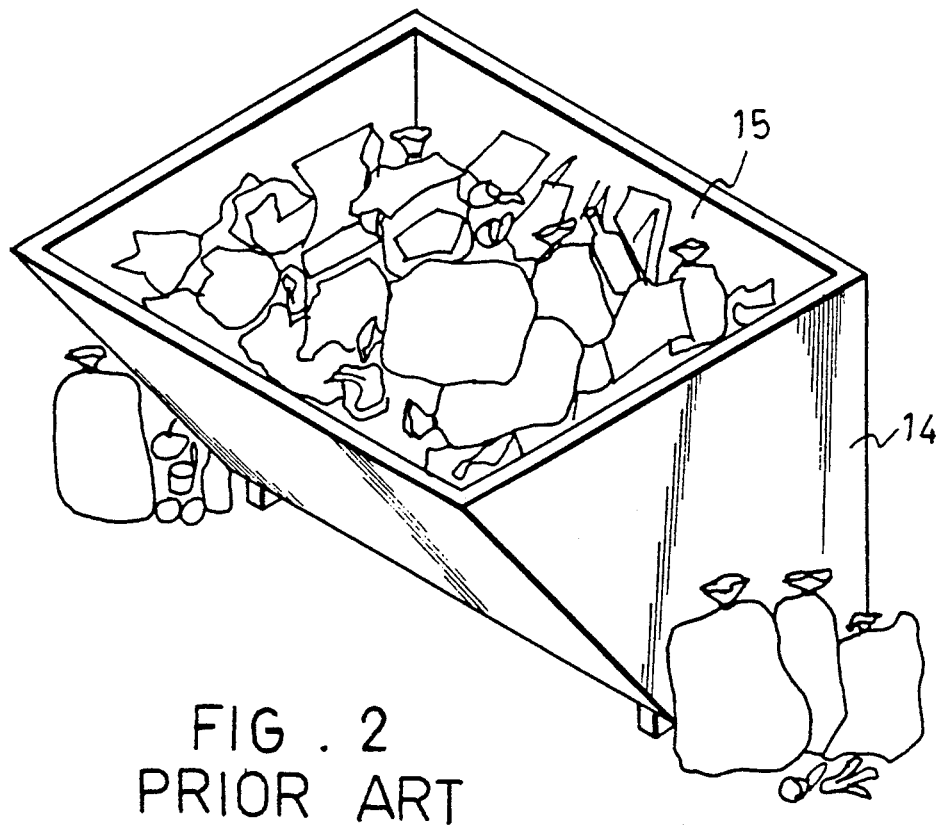
FIG. 2 illustrates a garbage receiving bin for a second example of a conventional garbage truck.
Figure 3:
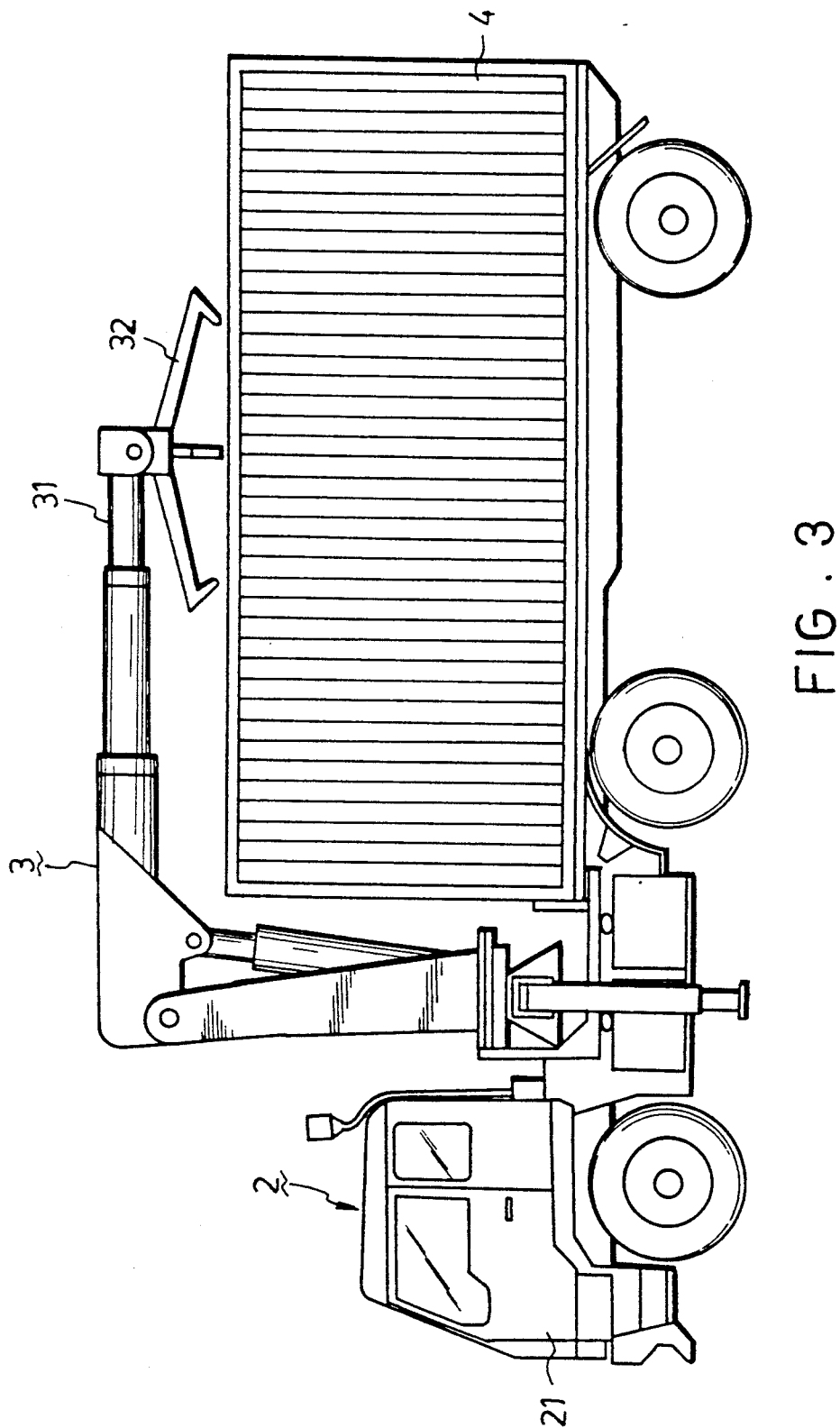
FIG. 3 is an illustration of the preferred embodiment of a garbage truck according to the present invention.

Referring to FIG. 3, the preferred embodiment of a garbage truck (2) according to the present invention is shown to comprise a motor truck (21) and a semitrailer connected to the motor truck (21) and having a garbage container (4) provided thereon. The garbage container (4) is preferably a used cargo container that is approximately 10 meters long. A power-operated hoisting means (3) is provided on the motor truck (21) adjacent to the garbage container (4). The hoisting means (3) includes a telescopic boom (31) and a grapple (32) provided on one end of the telescopic boom (31). The grapple (32) may have three or four claws. A four-clawed grapple (32) is employed by the preferred embodiment. The hoisting means (3) is operated so as to move garbage into the garbage container (4). The hoisting means (3) may be driven hydraulically, pneumatically, or by other conventional power-operated driving methods. The construction and operation of the hoisting means (3) is known by one skilled in the art and will not be detailed further.

Figure 4:
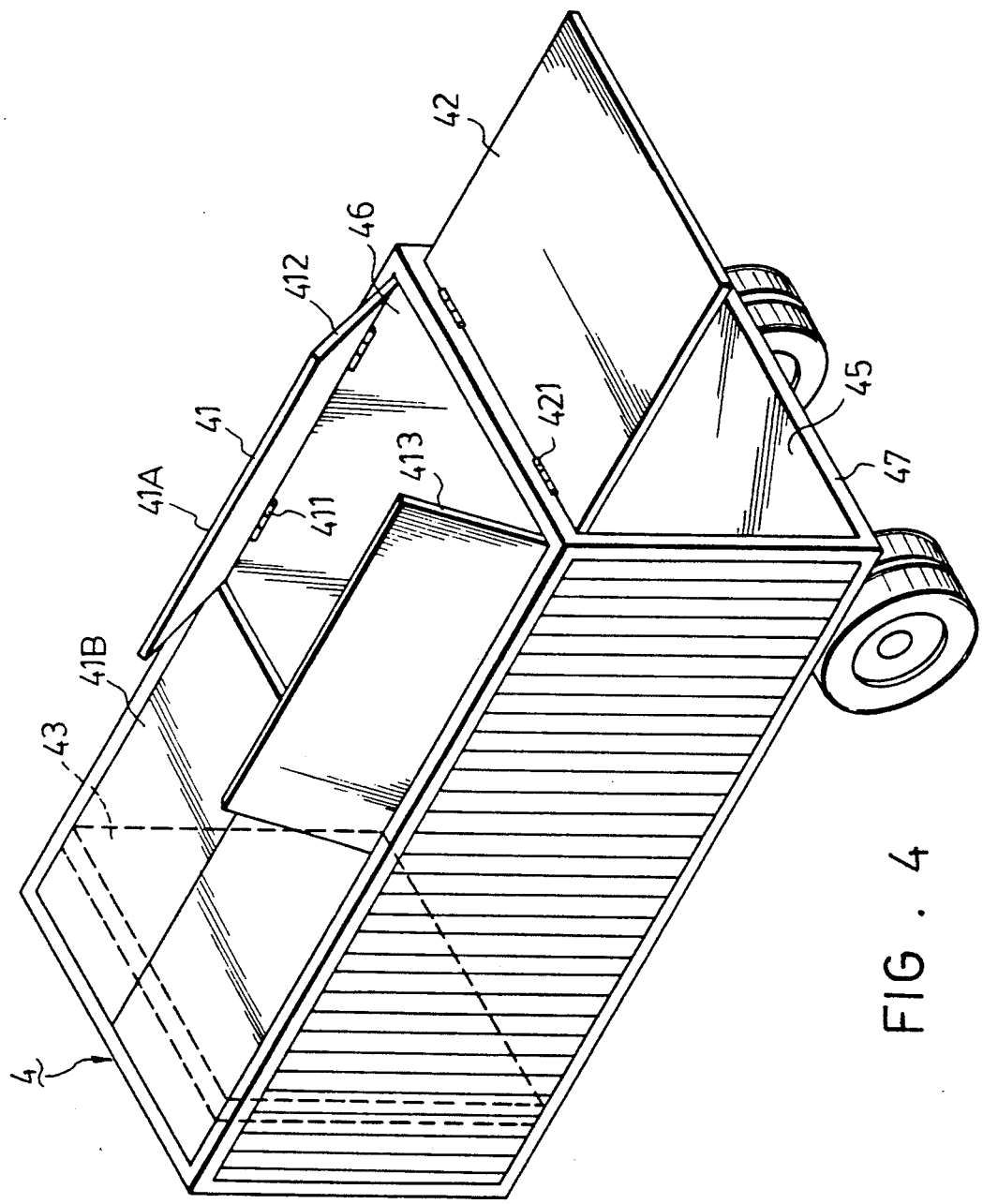
FIG. 4 is an illustration of the first preferred embodiment of a garbage container for the garbage truck of the present invention.

Referring to FIG. 4, the top end of the garbage container (4) is provided with a garbage inlet opening (46) to permit the entry of refuse therein. The rear side of the garbage container (4) is provided with a garbage outlet opening (47) for removing refuse from the garbage container (4). A power-operated top cover means (41) is provided on the top end of the garbage container (4) to cover the garbage inlet opening (46), while a power-operated side cover means (42) is provided on the rear side of the garbage container (4) to cover the garbage outlet opening (47). The cover means (41, 42) are moved between open and closed positions by means of hydraulic systems, pneumatic systems, or by other known driving systems. Such systems are known by one who is skilled in the art and will not be detailed herein.

The garbage container (4) confines a garbage receiving space (45). An upright push plate (43) is movably provided inside the receiving space (45) opposite to the opening (47). The push plate (43) is used to facilitate the removal of refuse inside the receiving space (45). Garbage removed from the container (4) may be deposited in a garbage dump. The garbage truck of the present invention can also be used to transport garbage from a garbage dump to a better location or to transfer garbage to a larger garbage container (such as one which is 20 meters long). By using the hoisting means (3), a larger volume of refuse can be collected at a faster pace.

The top cover means (41) may be a single panel or double panel type. A double panel type top cover means (41) is employed by the preferred embodiment. Furthermore, the top cover means (41) may comprise front and rear sections (41A, 41B). Only one of the front and rear sections (41A, 41B) is opened when the hoisting means (3) is used to move garbage into the garbage container (4). Thus, only a portion of the receiving space (45) is exposed to the atmosphere.

The front section (41A) includes a pair of cover panels (412, 413) and hinge means (411) which rotatably mount the cover panels (412, 413) onto the garbage container (4). The cover panels (412, 413) should preferably incline towards one another when they are rotated to the open position. The cover panels (412, 413) serve to guide refuse collected by the hoisting means (3) into the receiving space (45) and protect refuse from being blown away by wind or by unstable operation of the hoisting means (3).

The side cover means (42) is a single panel type and is rotatably mounted to the garbage container (4) via hinge units (421). The side cover means (42) may be mounted to a top edge or to a bottom edge of the garbage outlet opening (47). [In the preferred embodiment, the side cover means (42) is mounted to the top edge of the garbage outlet opening (47)]. The cover means (41, 42) can be maintained at different open positions to suit the operator's needs.

Figure 5:
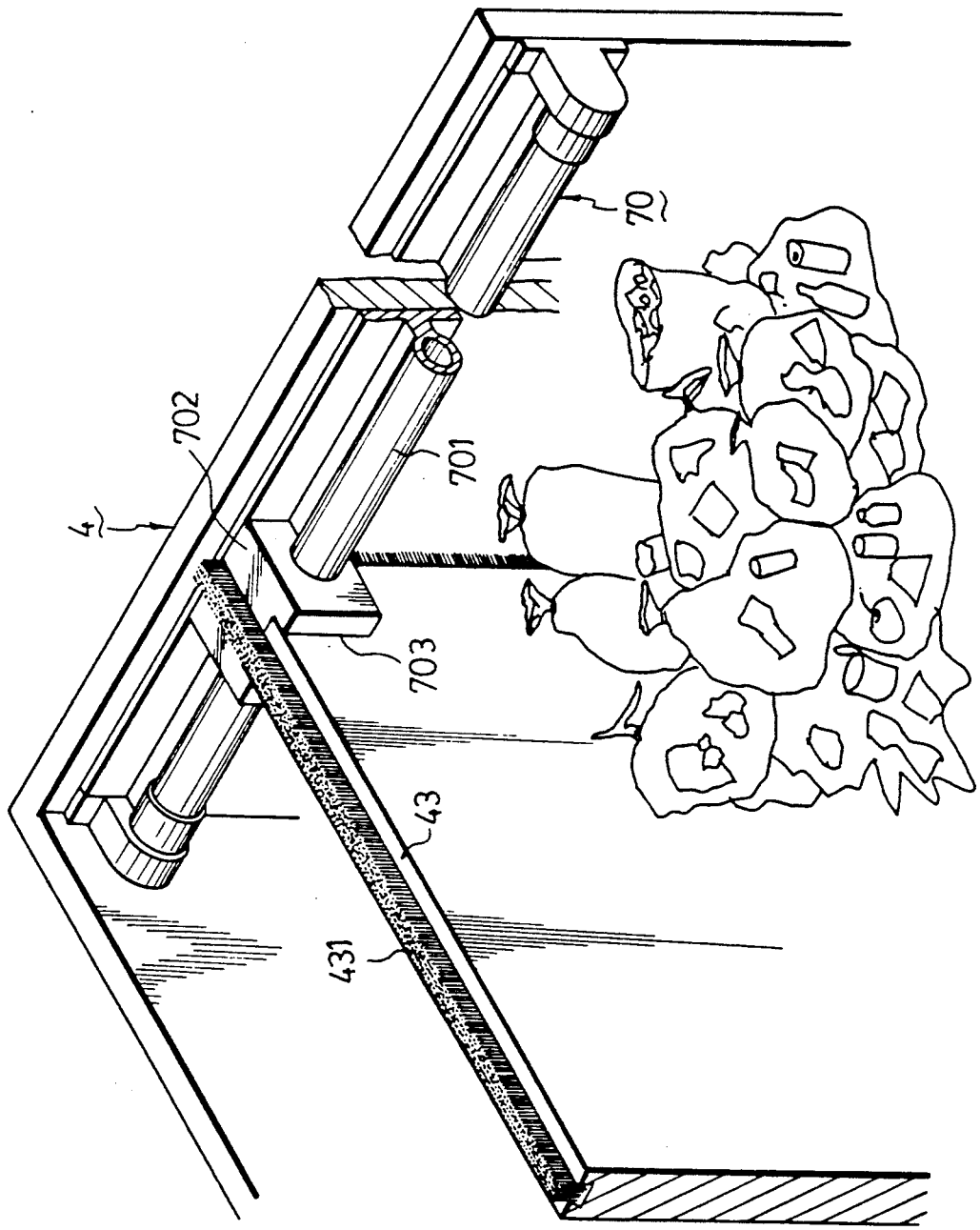
FIGS. 5 and 5A illustrate a power-operated push plate means for removing garbage from the garbage truck of the present invention.
Figure 5A:
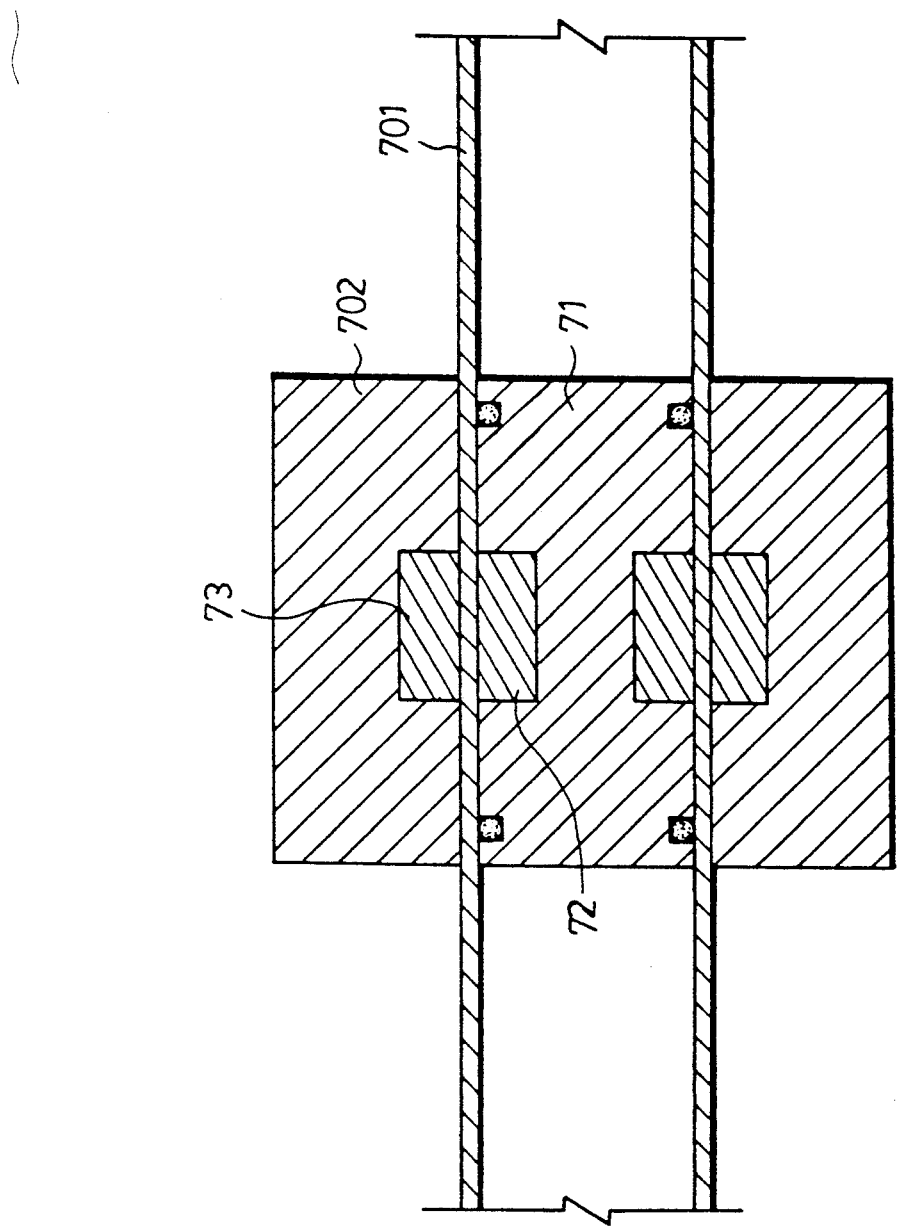
Figure 6:
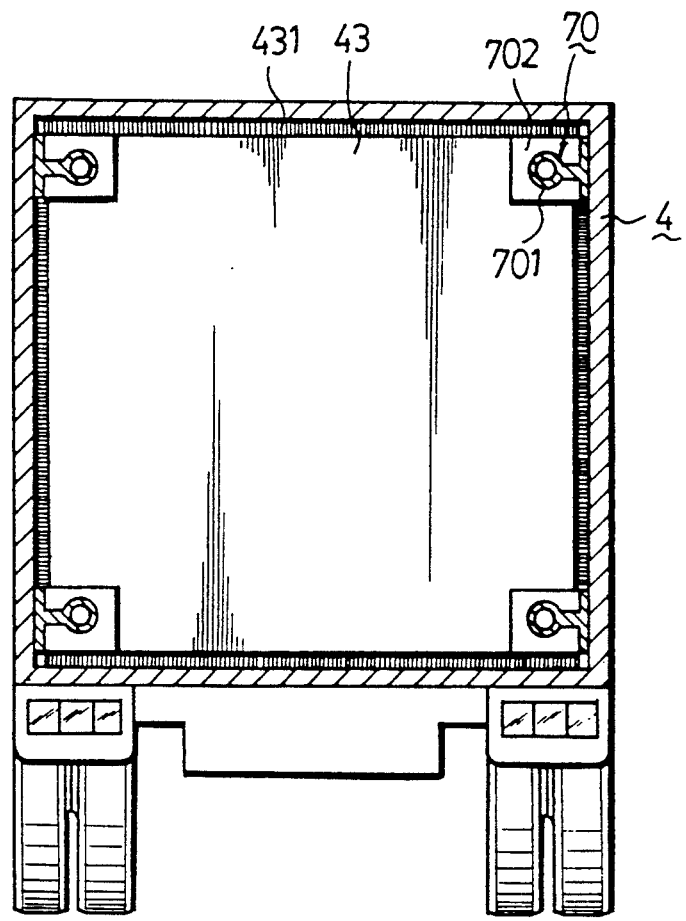
FIG. 6 is a rear view of the garbage truck to illustrate the power-operated push plate means.

FIGS. 5, 5A and 6 illustrate the push plate (43) and a power-operated driving means (70) for moving the push plate (43) inside the garbage container (4). The driving means (70) comprises a hydraulic (or pneumatic) cylinder (701) extending along the length of the garbage container (4) and a connector member (702) movably provided along the cylinder (701). The cylinder (701) has a piston (71) movably provided therein. The piston (71) is formed with an annular recess to receive a first magnet member (72). The connector (702) has an inner surface formed with an annular recess to receive a second magnet member (73) which attracts with the first magnet member (72). Hydraulic (or pneumatic) fluid is supplied to the cylinder (701) so as to move the piston (71), thereby correspondingly moving the connector member (702) along the cylinder (701). In the preferred embodiment, the cylinder (701) is provided on each of the four corners of the garbage container (4). The connector (702) is provided with a groove (703) to engage one corner of the push plate (43). The push plate (43) is further provided with peripheral bristles (431). The bristles (431) scrub against the internal surface of the garbage container (4) when the push plate (43) is movably driven therein.

Figure 7:
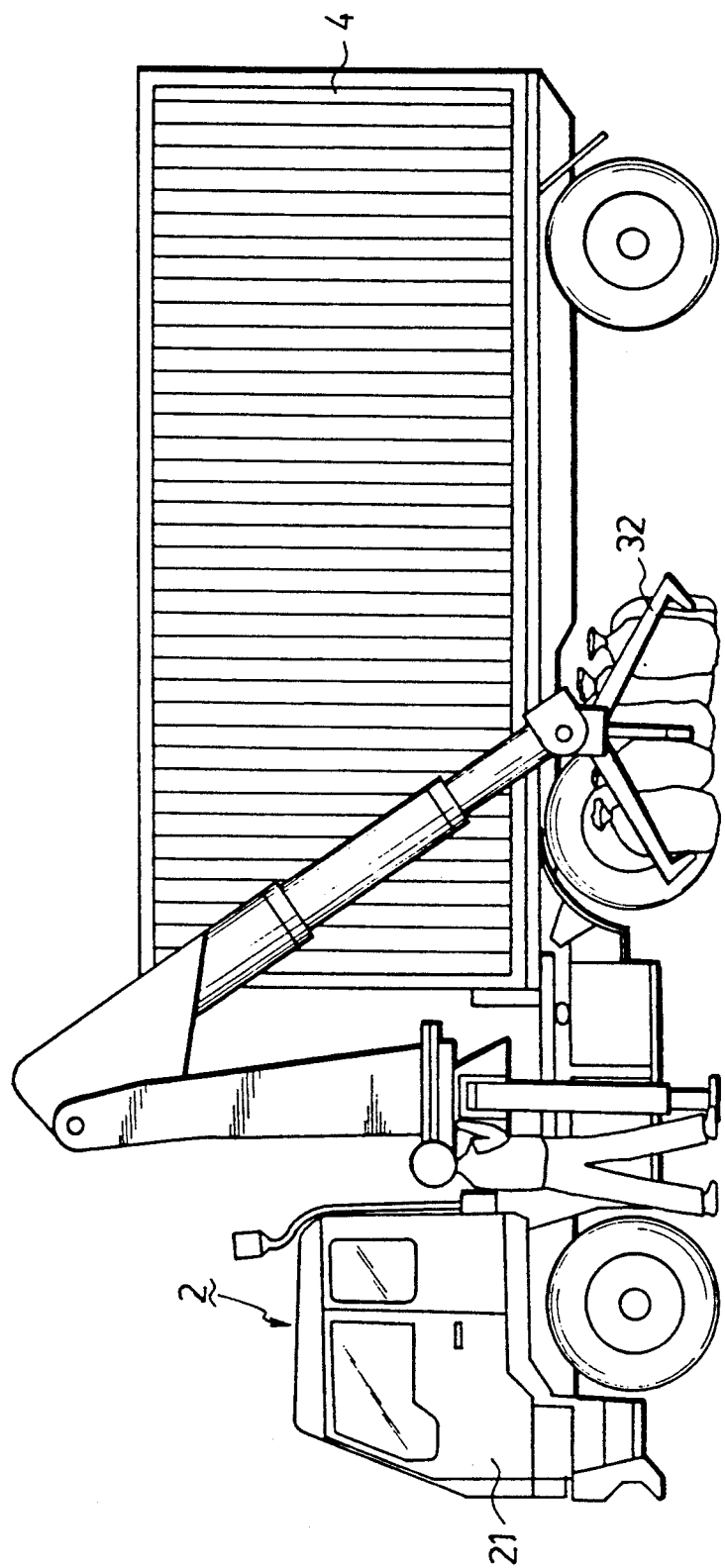
FIGS. 7 and 8 illustrate the garbage collecting operation of the garbage truck of the present invention.
Figure 8:
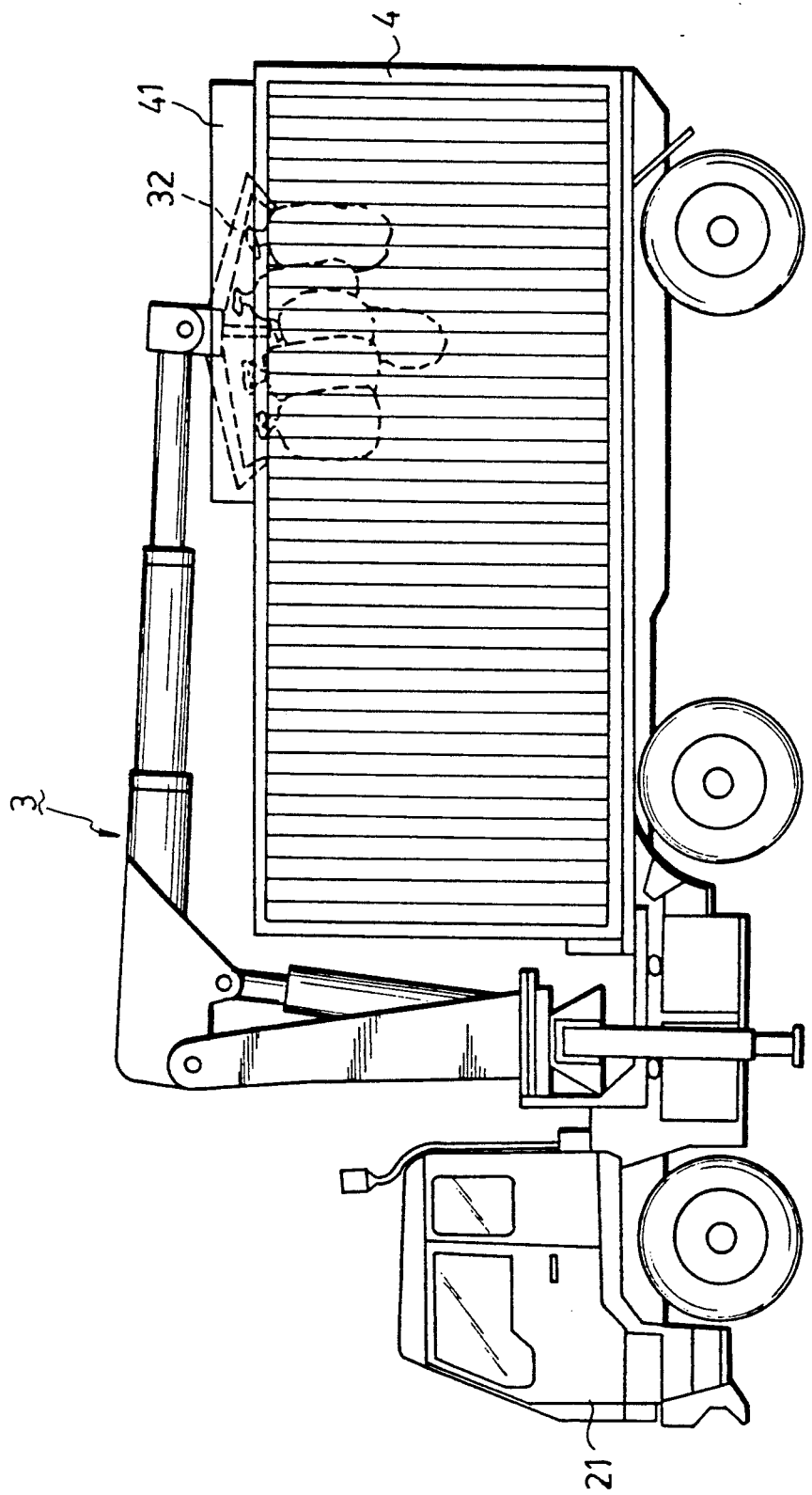
Figure 9:
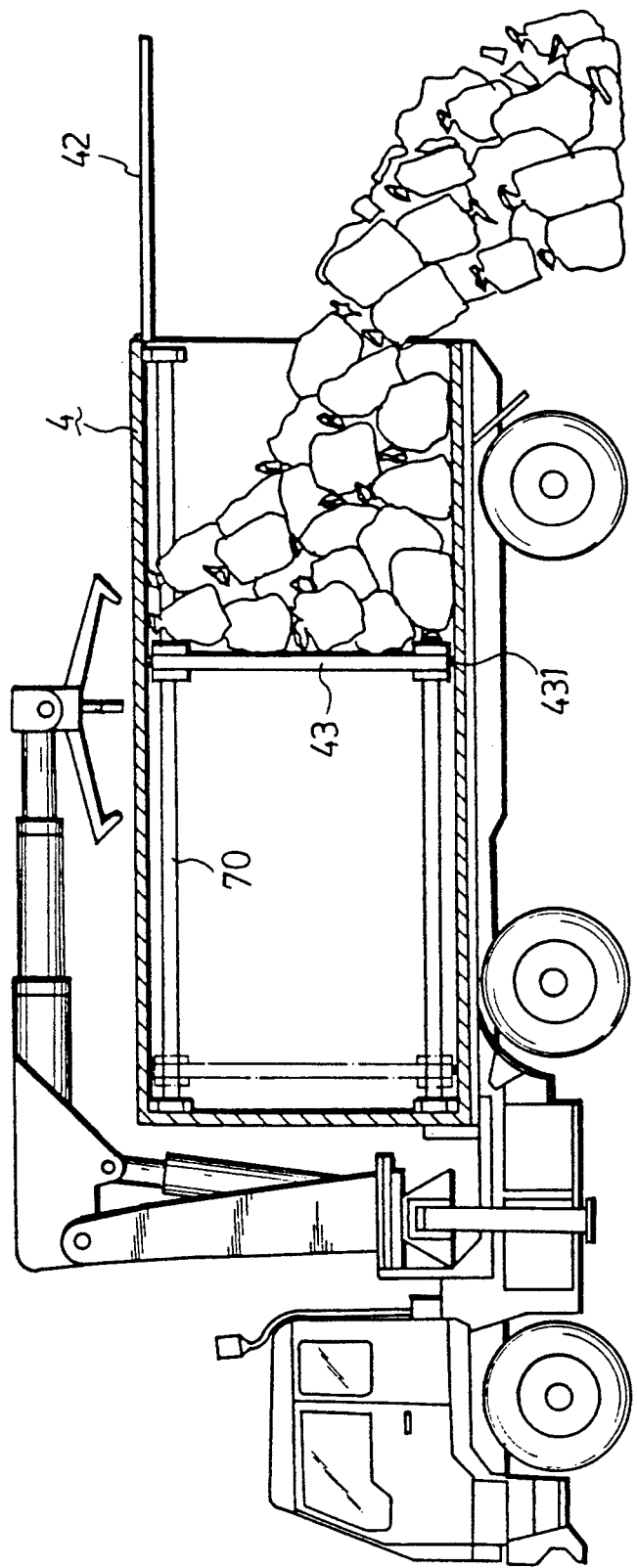
FIG. 9 illustrates the garbage removing operation of the garbage truck of the present invention.

FIG. 7 is an illustration of the preferred embodiment when in a garbage collecting operation. The preferred embodiment is positioned adjacent to a pile of garbage. An operator then controls the hoisting means (3) to lift said pile of garbage. The cover means (41) is then opened (Refer to FIG. 8), and the hoisting means (3) is maneuvered to transport the pile of garbage into the garbage container (4). Note that there is a limit to the volume of refuse which can be lifted by the hoisting means (3) at one time. Manual collection of refuse is still necessary if the quantity of refuse is relatively small such that it cannot be lifted by the hoisting means (3). It has thus been shown that a reduction in the required manpower can be attained with the use of the preferred embodiment. Garbage collection can be done at a faster pace, and a wider garbage collection route can be serviced. The motor truck (21) is driven to a garbage dump when the garbage container (4) is filled with refuse. Referring to FIG. 9, the side cover means (42) is first opened when removing garbage from the receiving space (45). The driving means (70) is then actuated so as to move the push plate (43) toward the opening (47), thereby pushing garbage out of the receivingspace (45). The bristles (431) provide a scrubbing action against the internal surface of the garbage container (4). This illustrates how garbage can be easily removed from the garbage container (4).

Figure 10:
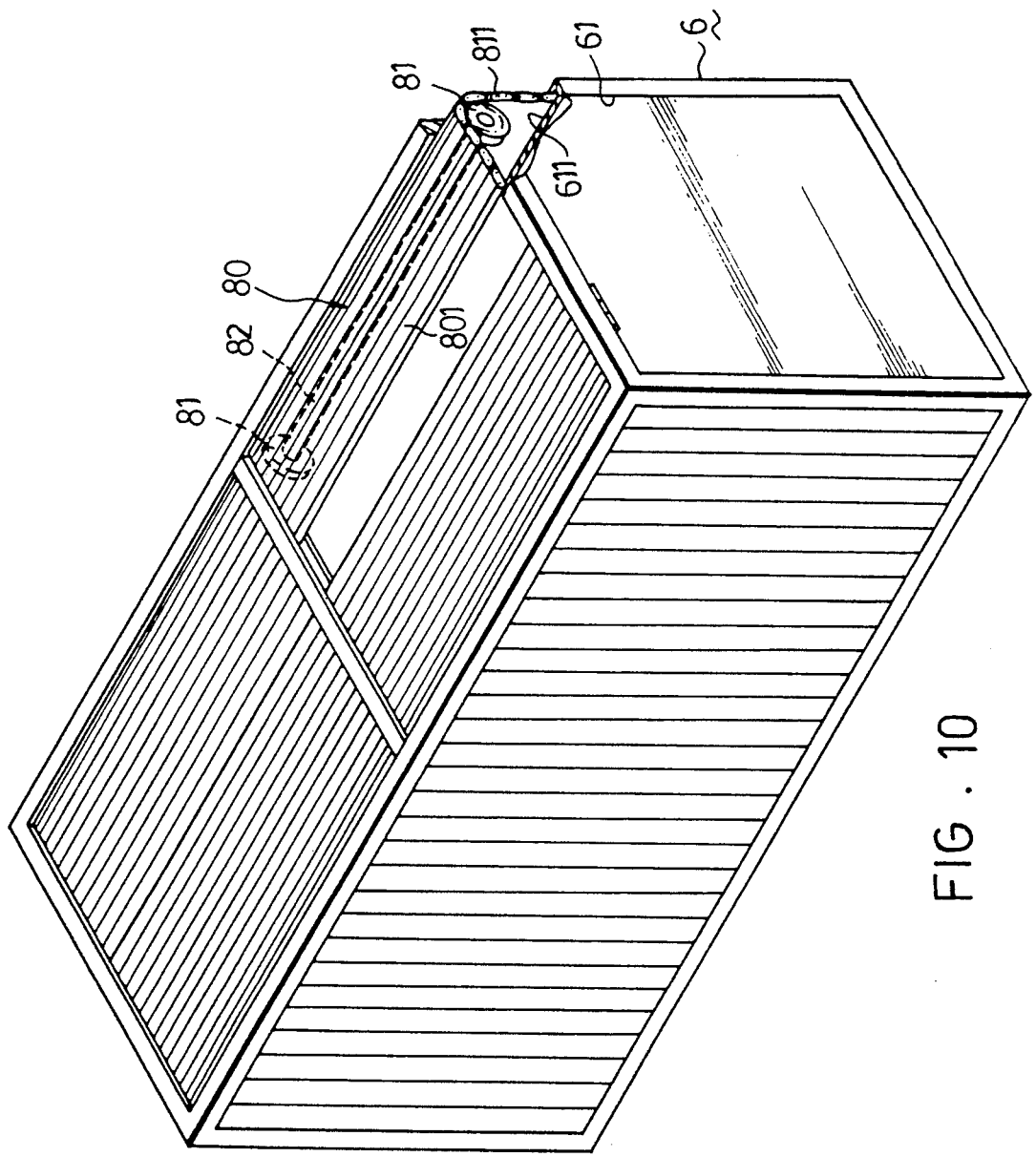
FIG. 10 is an illustration of the second preferred embodiment of a garbage container for the garbage truck of the present invention.

FIG. 10 is an illustration of a garbage container (6) for the second preferred embodiment of a garbage truck according to the present invention. The garbage container (6) has a pair of side walls (61) provided with an upright receiving groove (611) (only one of the receiving grooves (611) is shown) to receive a portion of the top cover means (80). The top cover means (80) comprises a plurality of slats (801), a chain means (811) interconnecting the slats (801) and a rotary shaft (82) mounted onto the side wall (61) of the garbage container (6). The rotary shaft (82) is provided with two or more sprockets (81) which engage the chain means (811). A power operated driving unit (such as a hydraulic pump or an electric motor) is provided adjacent to the receiving groove (611). The driving unit (not shown) rotatably drives the shaft (82) so as to retract or release the top cover means (80) from the receiving groove (611). Note that the operating space for moving the top cover means (80) between an open position and a closed position is less than that of the top cover means (41) shown in FIG. 4. The top cover means (80) may comprise left and right sections, as shown in FIG. 10.

Figure 11:
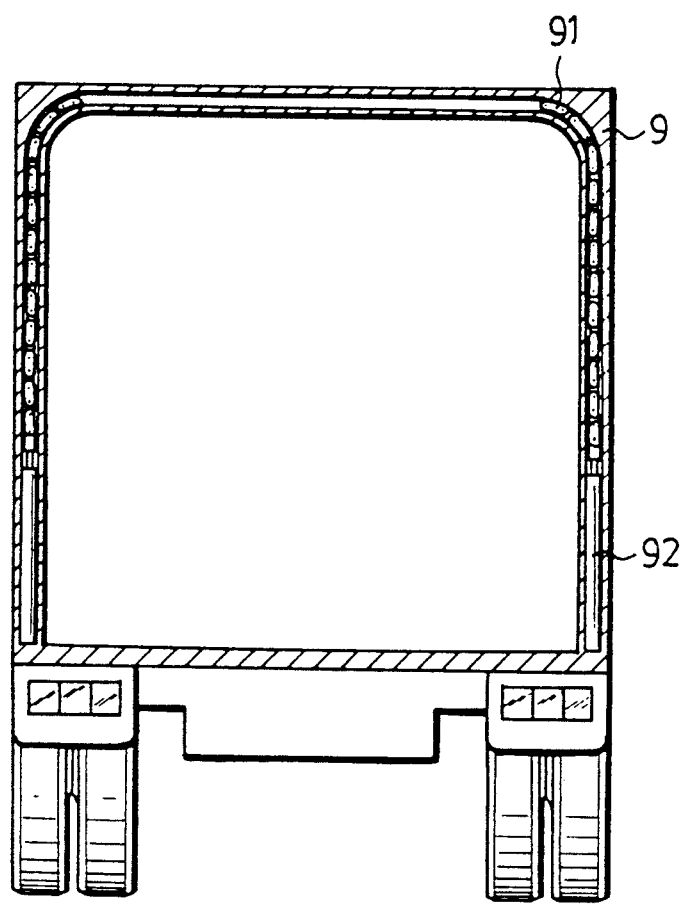
FIG. 11 is a rear view of the third preferred embodiment of a garbage container for the garbage truck of the present invention.

Referring to FIG. 11, the garbage container (9) of the third preferred embodiment of a garbage truck according to the present invention is shown to be substantially similar to the garbage container (6) of the second preferred embodiment. In the third preferred embodiment, a hydraulically (or pneumatically) operated piston rod (92) is provided inside the lowermost end of the receiving groove and is expansible and retractable so as to move the top cover means (91) between an open position and a closed position.

The advantages of using the garbage truck of the present invention are as follows:

1. The garbage receiving space is bigger. A used cargo container is recycled and is utilized as the garbage container for the garbage truck. A wider garbage collection route can be serviced because of the larger capacity of the garbage truck.

2. Garbage collection can be done at a faster pace, and less manpower is required. A hoisting means is used to move a large portion of refuse into the garbage container. The hoisting means can accommodate a larger volume of refuse per lift. The remaining refuse which cannot be lifted by the hoisting means may be collected manually.

3. Better care for the health of the garbage collectors is possible. A large portion of the refuse is lifted by the hoisting means. Thus, the garbage collectors are in contact with refuse for a shorter period of time. The risk of sickness due to prolonged exposure to an unsanitary environment is thus correspondingly reduced.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A garbage truck, comprising:
   motor truck means having a garbage container provided thereon, said garbage container confining a garbage receiving space and having a top end provided with a garbage inlet opening and a rear side provided with a garbage outlet opening;
   power-operated hoisting means provided on said motor truck means adjacent to said garbage container, said hoisting means being operated so as to move garbage into said garbage container;
   power-operated top cover means provided on the top end of said garbage container to cover said garbage inlet opening;
   power-operated side cover means provided on the rear side of said garbage container to cover said garbage outlet opening; and
   power-operated push plate means movably provided inside said garbage receiving space opposite to said garbage outlet opening, said push plate means being operated so as to push garbage out of said garbage container through said garbage outlet opening; said power-operated push plate means comprises an upright plate member and a power-operated driving means for moving said plate member inside said garbage container, said driving means including at least one cylinder means extending along a length of said garbage container and a connector member movably provided along each of said cylinder means and being secured to said plate member, each of said cylinder means having a piston movably provided therein, said piston being formed with an annular recess to receive a first magnet member, and said connector member having an inner surface formed with an annular recess to receive a second magnet member which interacts with said first magnet member;
   whereby, fluid is supplied to said cylinder means so as to move said piston and correspondingly move said connector member along said cylinder means, thereby moving said plate member inside said garbage receiving space to push garbage out of said garbage container.

2. The garbage truck as claimed in claim 1, wherein said hoisting means comprises a telescopic boom and a grapple provided on one end of said telescopic boom.

3. The garbage truck as claimed in claim 1, wherein said top cover means comprises a pair of cover panels rotatably mounted on the top end of said garbage container.

4. The garbage truck as claimed in claim 1, wherein said plate member is provided with peripheral bristles which scrub against an internal surface of said garbage container when said plate member is movably driven therein.

5. A garbage truck, comprising:
   motor truck means having a garbage container provided thereon, said garbage container confining a garbage receiving space and having a top end provided with a garbage inlet opening and a rear side provided with a garbage outlet opening;
   power-operated hoisting means provided on said motor truck means adjacent to said garbage container, said hoisting means being operated so as to move garbage into said garbage container;
   power-operated top cover means provided on the top end of said garbage container to cover said garbage inlet opening;
   power-operated side cover means provided on the rear side of said garbage container to cover said garbage outlet opening;
   power-operated push plate means movably provided inside said garbage receiving space opposite to said garbage outlet opening, said push plate means being operated so as to push garbage out of said garbage container through said garbage outlet opening; and
   wherein said garbage container has a side wall provided with an upright receiving groove to receive a portion of said top cover means; said top cover means including a plurality of slats, a chain means interconnecting said slats and a rotary shaft mounted onto said side wall of said garbage container; said rotary shaft being provided with a sprocket means which engages said chain means; and said rotary shaft being rotatably driven so as to retract or release said slats from said receiving groove.

6. A garbage truck, comprising:

motor truck means having a garbage container provided thereon, said garbage container confining a garbage receiving space and having a top end provided with a garbage inlet opening and a rear side provided with a garbage outlet opening;

power-operated hoisting means provided on said motor truck means adjacent to said garbage container, said hoisting means being operated so as to move garbage into said garbage container;

power-operated top cover means provided on the top end of said garbage container to cover said garbage inlet opening;

power-operated side cover means provided on the rear side of said garbage container to cover said garbage outlet opening;

power-operated push plate means movably provided inside said garbage receiving space opposite to said garbage outlet opening, said push plate means being operated so as to push garbage out of said garbage container through said garbage outlet opening; and wherein said garbage container has a side wall provided with an upright receiving groove to receive a portion of said top cover means; and said top cover means including a plurality of interconnected slats and a piston rod disposed on a lowermost end of said receiving groove and being extendable and retractable so as to move uppermost ones of said slats in and out of said receiving groove.

* * * * *